United States Patent [19]

Chenausky et al.

[11] Patent Number: 4,484,333

[45] Date of Patent: Nov. 20, 1984

[54] COUPLED WAVEGUIDE FREESPACE LASER

[75] Inventors: Peter P. Chenausky, Avon; Richard A. Hart, Wethersfield; Lanny M. Laughman, Bolton; Ronald E. Belek, Coventry; Robert J. Wayne, Berlin, all of Conn.

[73] Assignee: United Technologies Corporation, Hartford, Conn.

[21] Appl. No.: 348,566

[22] Filed: Feb. 12, 1982

[51] Int. Cl.³ .................................................. H01S 3/03
[52] U.S. Cl. ........................................ 372/64; 372/97; 372/12; 372/102; 372/32; 372/20
[58] Field of Search ........................ 372/97, 12, 20, 23, 372/64, 32, 61, 102, 105

[56] References Cited

U.S. PATENT DOCUMENTS

| 3,387,226 | 6/1968 | Haisma et al. | 372/61 |
| 3,961,283 | 6/1976 | Abrams et al. | 372/64 |
| 4,174,504 | 11/1979 | Chenausky et al. | 372/97 |
| 4,176,327 | 11/1979 | Wayne et al. | 372/12 |
| 4,380,073 | 4/1983 | Wayne | 372/12 |

Primary Examiner—William L. Sikes
Assistant Examiner—Léon Scott, Jr.
Attorney, Agent, or Firm—Eric W. Petraske

[57] ABSTRACT

An RF discharge waveguide laser is modulated by an electro-optic modulator positioned in a second optical cavity coupled to a gain cavity containing the waveguide.

1 Claim, 3 Drawing Figures

COUPLED WAVEGUIDE FREESPACE LASER

The Government has rights in this invention pursuant to Contract No. DAAK80-79-C-0302 awarded by the Department of the Army.

1. Technical Field

The field of the invention is that of a waveguide laser having an electro-optical modulator located in a cavity coupled to the cavity having optical gain.

2. Background Art

U.S. Pat. No. 4,176,327, issued Nov. 27, 1979 to Robert J. Wayne et al, discloses a laser having an electro-optical modulator together with a polarizing coupler, in which the modulator Q-switches the laser by converting linearly polarized light to circularly polarized light, then reconverting that circularly polarized light to orthogonal linearly polarized light which is coupled out of the optical cavity. The laser disclosed in this reference employs a single optical cavity which does not contain a waveguide.

DISCLOSURE OF INVENTION

The invention relates to an RF discharge waveguide laser, in which an optical cavity containing a grating and a waveguide enclosing the gain medium is coupled to a second modulating cavity containing an electro-optical modulator and an outcoupling device. The electro-optical modulator is used to Q-switch and cavity dump the laser power.

BEST MODE FOR CARRYING OUT THE INVENTION

Figure 1:
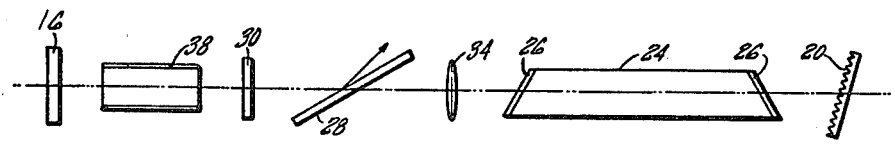
FIG. 1 illustrates a prior art laser.

In FIG. 1, a laser illustrated in FIG. 1 of U.S. Pat. No. 4,176,327 is shown. Mirror 16 and grating 20 bound an optical cavity that includes gain cell 24 having windows 26, coupling lens 34, polarization coupler 28, quarter-wave plate 30 and electro-optic modulator 38. The laser may be Q-switched and cavity dumped by using modulator 38 to convert linearly polarized light to the orthogonal polarization state that is coupled out of the cavity by coupler 28. There is no waveguide in the laser, so that the radiation is in a freespace mode, rather than in a guided mode and the problem of coupling radiation between these modes does not arise. The location of the cavity elements is not sensitive for this prior-art laser because there is a single cavity and no coupling problem.

Figure 2:
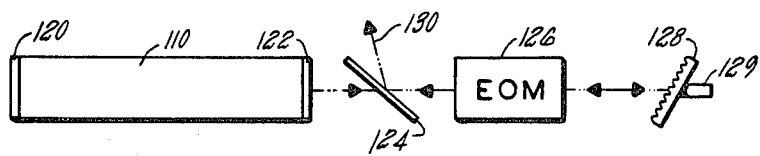
FIG. 2 illustrates the application of the teachings of the prior art to an RF waveguide laser.

If the teachings of this prior art patent are applied to the problem of coupling radiation out of an RF discharge laser, a configuration such as that illustrated in FIG. 2 would result. In this figure, an optical system comprises two cavities, the first one bracketing waveguide 110, which is bounded by mirror 120 having a reflectivity of 100% and mirror 122 having a reflectivity of approximately 60%. Radiation passed by mirror 122 passes through Brewster coupler 124, through electro-optical modulator 126 and is reflected by grating 128, the position of which is adjusted by piezoelectric adjuster 129. Mirror 122 and grating 128 define a second optical cavity, coupled to the first optical cavity by means of mirror 122. It is well known in the laser art that the use of coupled laser cavities imposes severe alignment restrictions on the system and that coupling from waveguide to freespace modes and back always involves some coupling loss. One skilled in the art would apply the teachings of the '327 patent to a waveguide laser by closing one end of the waveguide with a mirror and placing the grating and the modulator on the same side of the waveguide so that there is one coupling, not two.

Based upon the teachings of the prior art '327 patent, then, one would expect that radiation generated in waveguide 110 would pass through Brewster coupling plate 124, be converted in electro-optical modulator 126 to circularly polarized light which is reflected off grating 128, reconverted to plane polarized light having a plane of polarization at right angles to the first light and then be coupled out of the cavity along beam 130. The laser could be Q-switched according to the teaching of the prior art by adjusting the voltage on modulator 126.

It has been found, however, that when a high gain laser employs this configuration it does not work, because grating 128 inevitably scrambles the polarization of the radiation reflected from it, converting incident circularly polarized light into slightly elliptically polarized light having unequal components of right- and left-hand polarization. Not all of the light is coupled out into beam 130, but a small fraction of the light passes through and reenters the gain cavity. If the gain of the laser is low, the radiation coupled back will remain below threshold and the device will not lase. In a high gain laser, however, even a small amount of feedback radiation is intolerable. It has been found that it is not possible to Q-switch a laser constructed as in FIG. 2 because it is not possible to turn the laser off completely.

Figure 3:
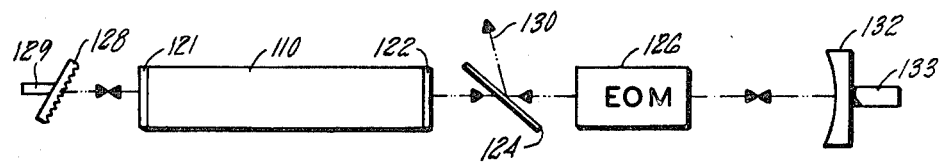
FIG. 3 illustrates an embodiment of the present invention.

A laser constructed according to the present invention is illustrated in FIG. 3, in which the frequency selective device has been placed on the opposite side of the gain medium from the switching device. The gain cavity is now bounded by grating 128 and reflective mirror 122, with gain medium 110 being confined by end plate 121. The coupling cavity is now bounded by partially reflective mirror 122 and focusing mirror 132 adjusted by piezoelectric adjusting means 133 and includes coupling plate 124 and modulator 126 as before. Placing grating 128 close to but not in physical contact with gain medium 110 is a disadvantage, as taught by the prior art, because there is inevitably some intracavity loss introduced by the small unguided distance, even when the grating is mounted as close to the waveguide as possible. Further losses will be caused by the obvious problems of misalignment which occur when the reflective means is not physically attached to the waveguide. Illustratively, end plate 120 at the end of the waveguide has a reflectivity of 95% so that approximately 5% of the waveguide power is transmitted through plate 120 and reflected back by grating 128 thereby defining a third cavity, because the reflectivity of end plate 121 is less than 100%. Output beam 130 is now produced by having polarized light passing through mirror 122, illustratively P polarized light, passing through Brewster coupler 124 and through modulator 126 where it is converted to circularly polarized light which is reflected back by mirror 132 without scrambling the polarization, reconverted in modulator 126 to S polarized light which is outcoupled by Brewster coupler 124 with high efficiency to output beam 130.

In an illustrative embodiment of the present invention, discharge tube 110 was 34 centimeters in length having a cross section of $(2.25 \text{ mm})^2$ and contained $CO_2$ at a pressure of 89 Torr. Mirror 120 had a reflectivity of approximately 95%; mirror 122 had a reflectivity of 60%; electro-optical modulator 126 was formed from a piece of CdTe, 5 centimeters in length upon which a voltage of 1,600 volts DC was impressed in order to suppress oscillation. Mirror 132 had a focal length of 40 centimeters and was spaced 20 centimeters from mirror 122. Grating 128 was used to select the 10P20 line of $CO_2$ and was located 14 centimeters from the end of the waveguide. This laser was operated with a pulse repetition rate of 100 kilohertz producing pulses having a 60 nanosecond FWHM.

We claim:

1. A waveguide laser comprising:

a first optical cavity including a gain medium disposed within an optical waveguide having a predetermined transverse dimension, said cavity being bounded by a diffraction grating disposed a predetermined distance from a first end of said waveguide along an axis passing through said waveguide and a first partially reflective element disposed along said axis adjacent a second end of said waveguide; and a second optical cavity disposed along said axis and containing polarization-dependent means for coupling radiation out of said laser at an angle with respect to said axis, said second cavity being optically coupled to said first cavity by said first partially reflective element and containing an electro-optic modulator disposed between said polarization dependent means and a substantially 100% reflective element terminating said second optical cavity, in which said first optical cavity is divided into a gain cavity including said waveguide and bounded by said first partially reflective element and a second partially reflective element having a reflectivity of approximately 95% that is positioned adjacent said first end of said waveguide and a line control cavity comprising said diffraction grating and said second partially reflective element, whereby a portion of radiation in said gain medium is reflected with a predetermined frequency dependence from said gain cavity into and out of said line control cavity, so that a spectral line determined by said diffraction grating is enhanced in power, thereby determining the frequency of operation of said laser.

* * * * *